United States Patent
Iwasawa et al.

[19]

[11] Patent Number: 5,943,315
[45] Date of Patent: Aug. 24, 1999

[54] MULTIPLEX TRANSMISSION SYSTEM AND ABNORMALITY PROCESSING CONTROLLING METHOD AND APPARATUS USED THEREFOR

[75] Inventors: Yoshio Iwasawa; Nobuhiro Imaizumi, both of Shizuoka, Japan

[73] Assignee: Yazaki Corporation, Tokyo, Japan

[21] Appl. No.: 08/878,530

[22] Filed: Jun. 19, 1997

[30] Foreign Application Priority Data

Jun. 20, 1996 [JP] Japan .................................. 8-160179

[51] Int. Cl.$^6$ .................................. H04J 1/16; H04J 3/14
[52] U.S. Cl. .................... 370/216; 370/242; 370/307
[58] Field of Search ......................... 370/216, 221, 370/227, 228, 553, 242, 445, 462, 252, 458, 498, 211, 230, 294, 307, 360; 364/138, 130; 307/9.1, 10.1, 412, 413

[56] References Cited

U.S. PATENT DOCUMENTS

| | | | |
|---|---|---|---|
| 5,079,759 | 1/1992 | Kajiyama | 370/447 |
| 5,090,012 | 2/1992 | Kajiyama et al. | 370/449 |
| 5,142,526 | 8/1992 | Moriue et al. | 370/445 |
| 5,224,124 | 6/1993 | Hamano et al. | 375/259 |
| 5,251,211 | 10/1993 | Mutoh et al. | 370/445 |
| 5,274,638 | 12/1993 | Michihira et al. | 370/462 |
| 5,329,525 | 7/1994 | Sakagami | 370/449 |
| 5,438,506 | 8/1995 | Oho et al. | 364/138 |
| 5,504,737 | 4/1996 | Ichii et al. | 370/242 |
| 5,668,796 | 9/1997 | No | 370/216 |
| 5,675,189 | 10/1997 | Anma et al. | 307/9.1 |
| 5,724,601 | 3/1998 | Kobayashi et al. | 307/106 |
| 5,808,371 | 9/1998 | Kon'i et al. | 370/252 |
| 5,825,097 | 10/1998 | Saito et al. | 307/10.1 |

FOREIGN PATENT DOCUMENTS

| | | |
|---|---|---|
| 58-12002 | 1/1983 | Japan . |
| 4-239899 | 8/1992 | Japan . |

*Primary Examiner*—Dang Ton
*Assistant Examiner*—Phirin Sam
*Attorney, Agent, or Firm*—Armstrong, Westerman, Hattori, McLeland & Naughton

[57] ABSTRACT

A multiplex transmission system includes a multiplex transmission network through which normality and abnormality processing control specification information (PCSI) for loads are transmitted. A master load control unit (LCU) is connected to the multiplex transmission network. The master load control unit can multiplex the abnormality PCSi for a load as a main operation. A slave load control unit (LCU) is connected to the multiplex transmission network. The slave load control unit can multiplex the abnormality PCSI as a slave operation between itself and the main LCU. A storage device is mounted in the master and slave LCUs. The storage device can update and hold the information and read it at any time. In this multiplex transmission system, multiplexing abnormality can be detected and abnormality processing in the LCU in an abnormal state is controlled to urge its recovery of the LCU to a normal state.

11 Claims, 11 Drawing Sheets

FIG. 2

| LOAD | ABNORMALITY CONTROL | OUTPUT BEFORE WIRE BREAKING | DEFAULT OF ABNORMALITY CONTROL INFORMATION |
|---|---|---|---|
| L 1 | FORCIBLE ON | OFF | ON |
| L 1 | FORCIBLE ON | ON | ON |
| L 2 | FORCIBLE OFF | OFF | OFF |
| L 2 | FORCIBLE OFF | ON | OFF |
| L 3 | SUCCESSION | OFF | OFF |
| L 3 | SUCCESSION | ON | ON |

FIG. 11

| LOAD | OUTPUT BEFORE WIRE BREAKING | OUTPUT AFTER WIRE BREAKING |
|---|---|---|
| L 1 | OFF | OFF |
| L 1 | ON | ON |
| L 2 | OFF | OFF |
| L 2 | ON | ON |
| L 3 | OFF | OFF |
| L 3 | ON | ON |

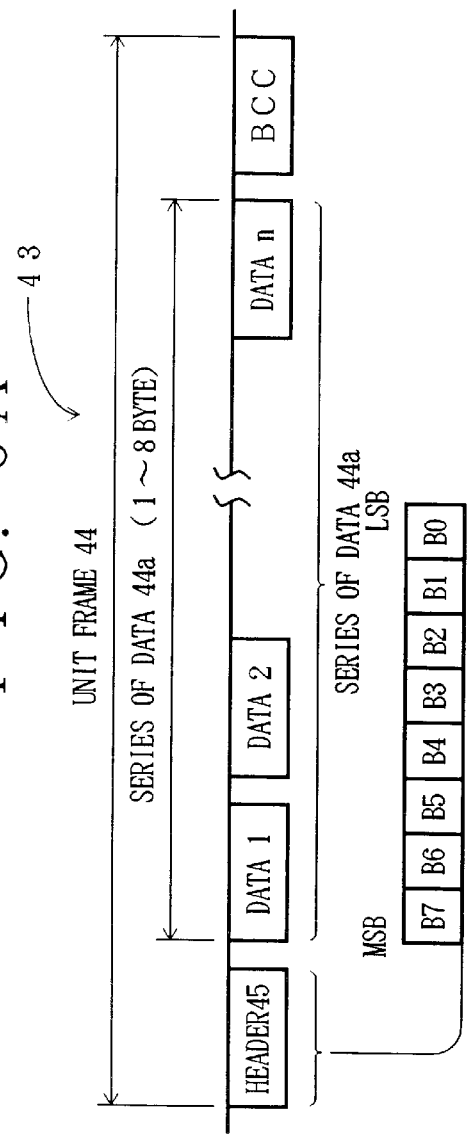

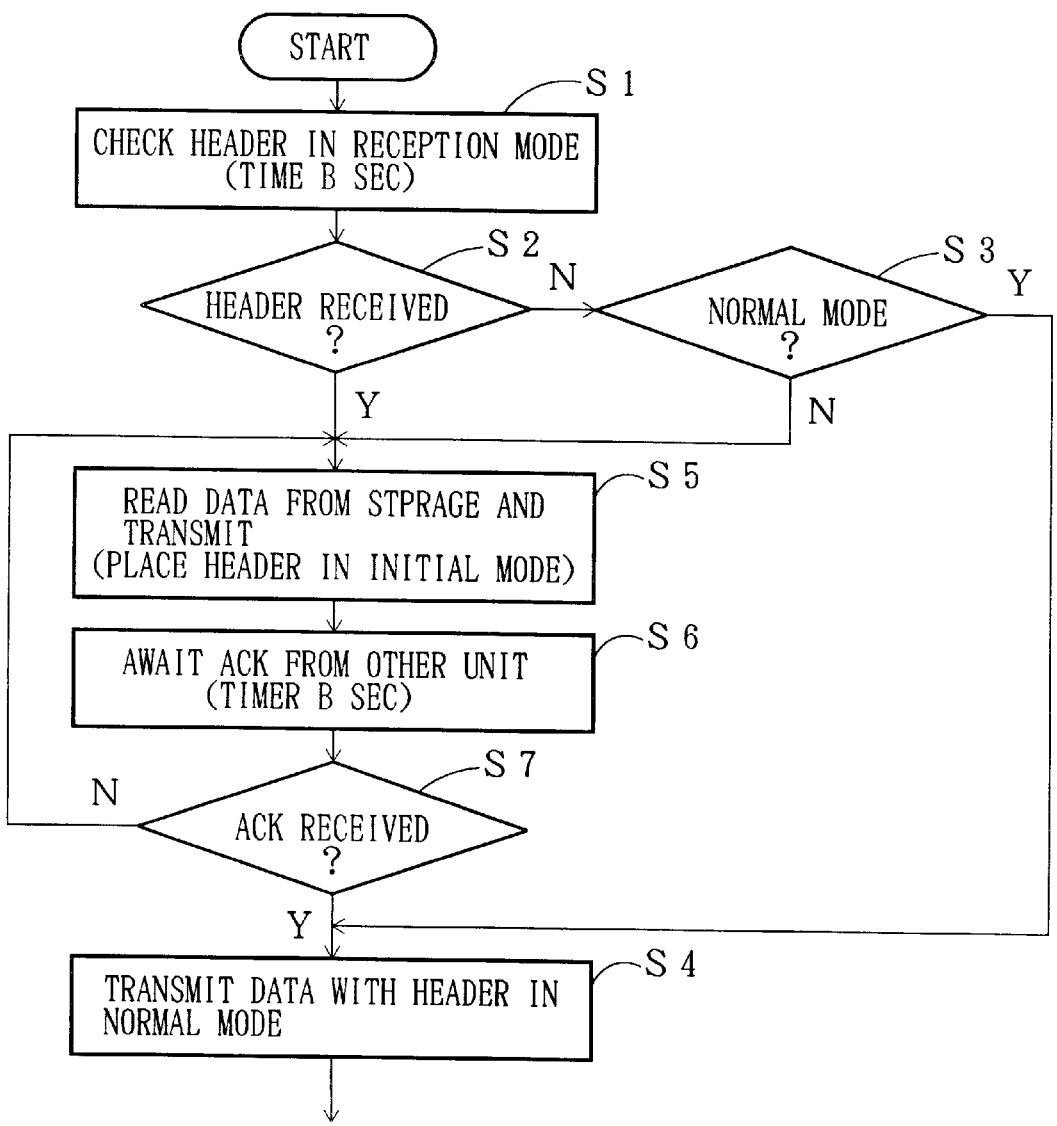

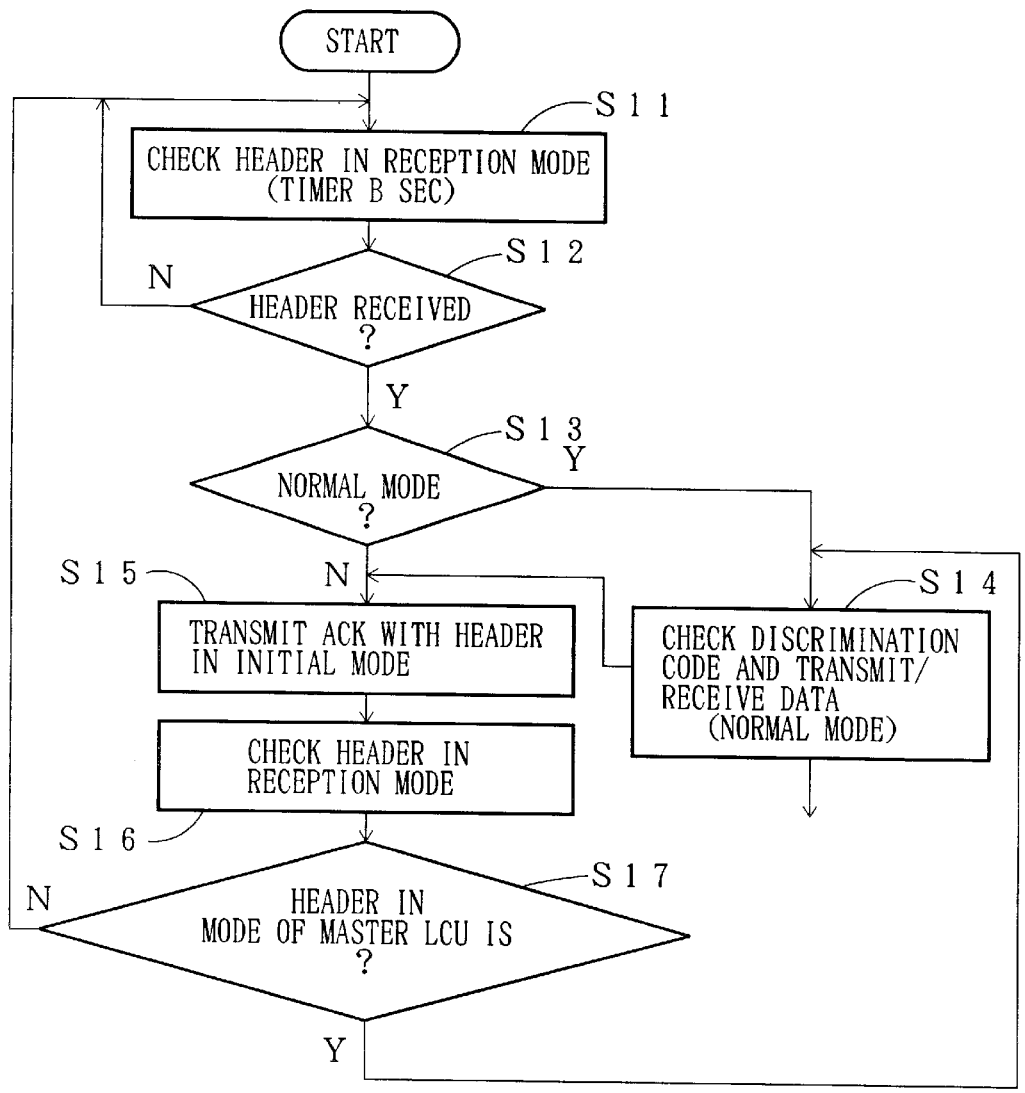

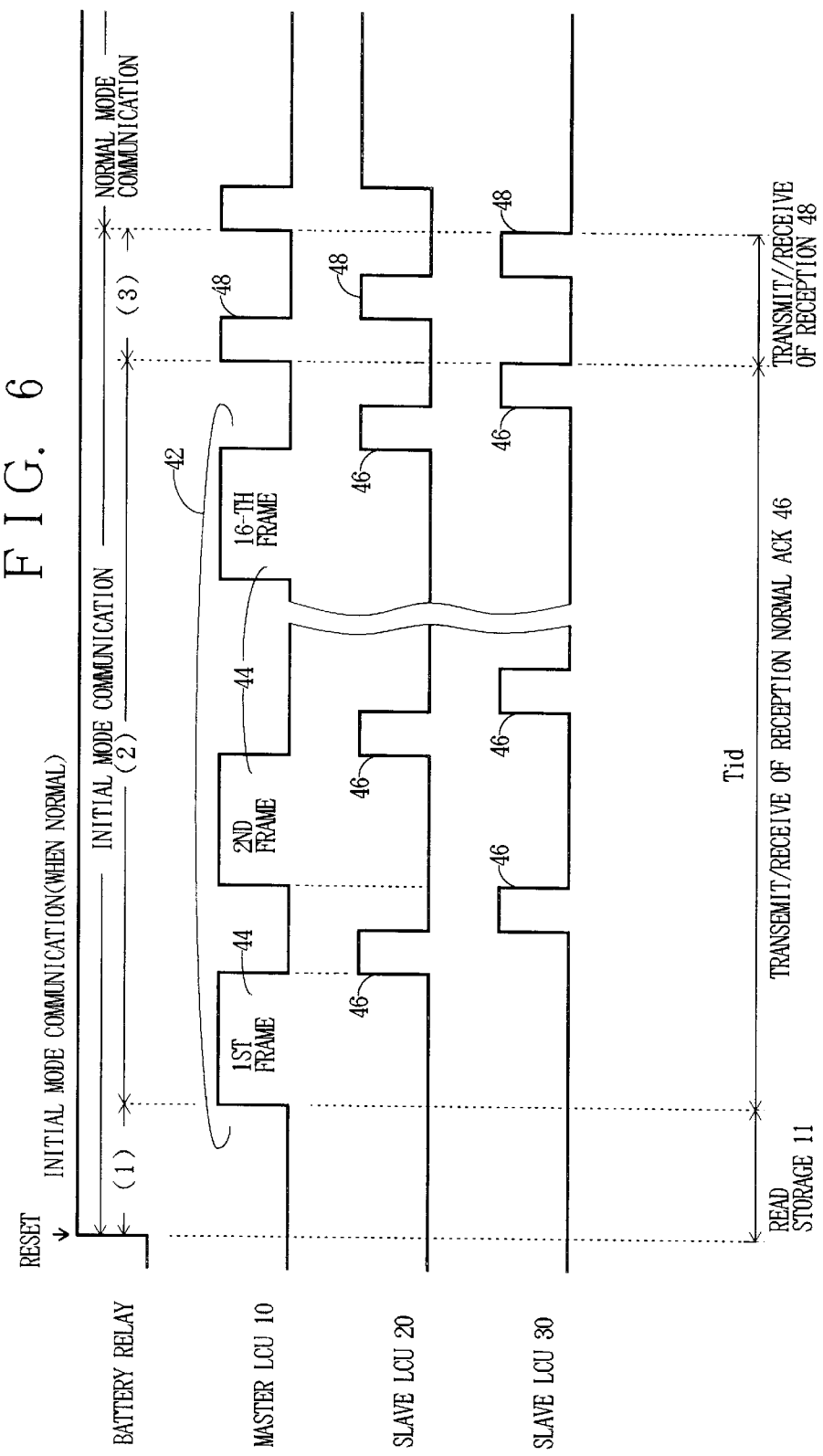

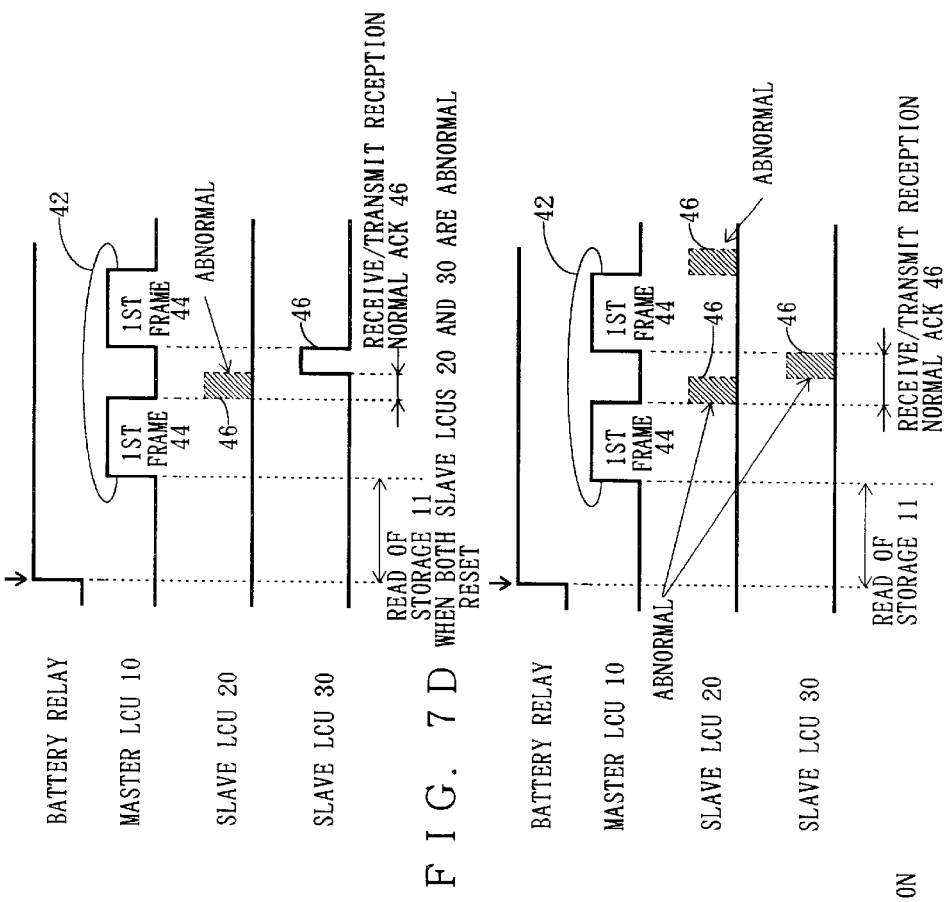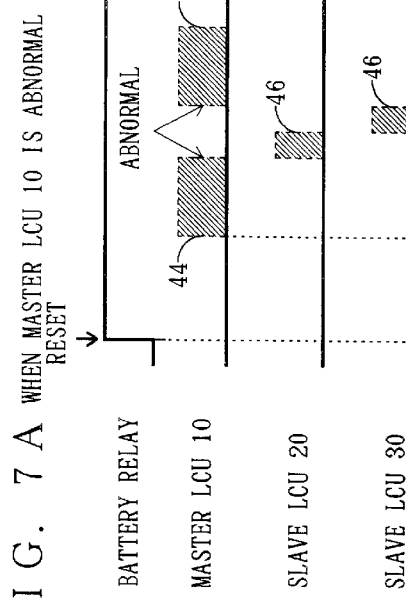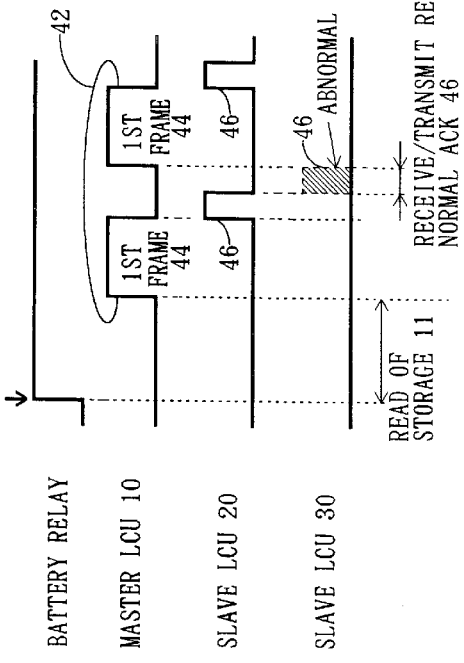

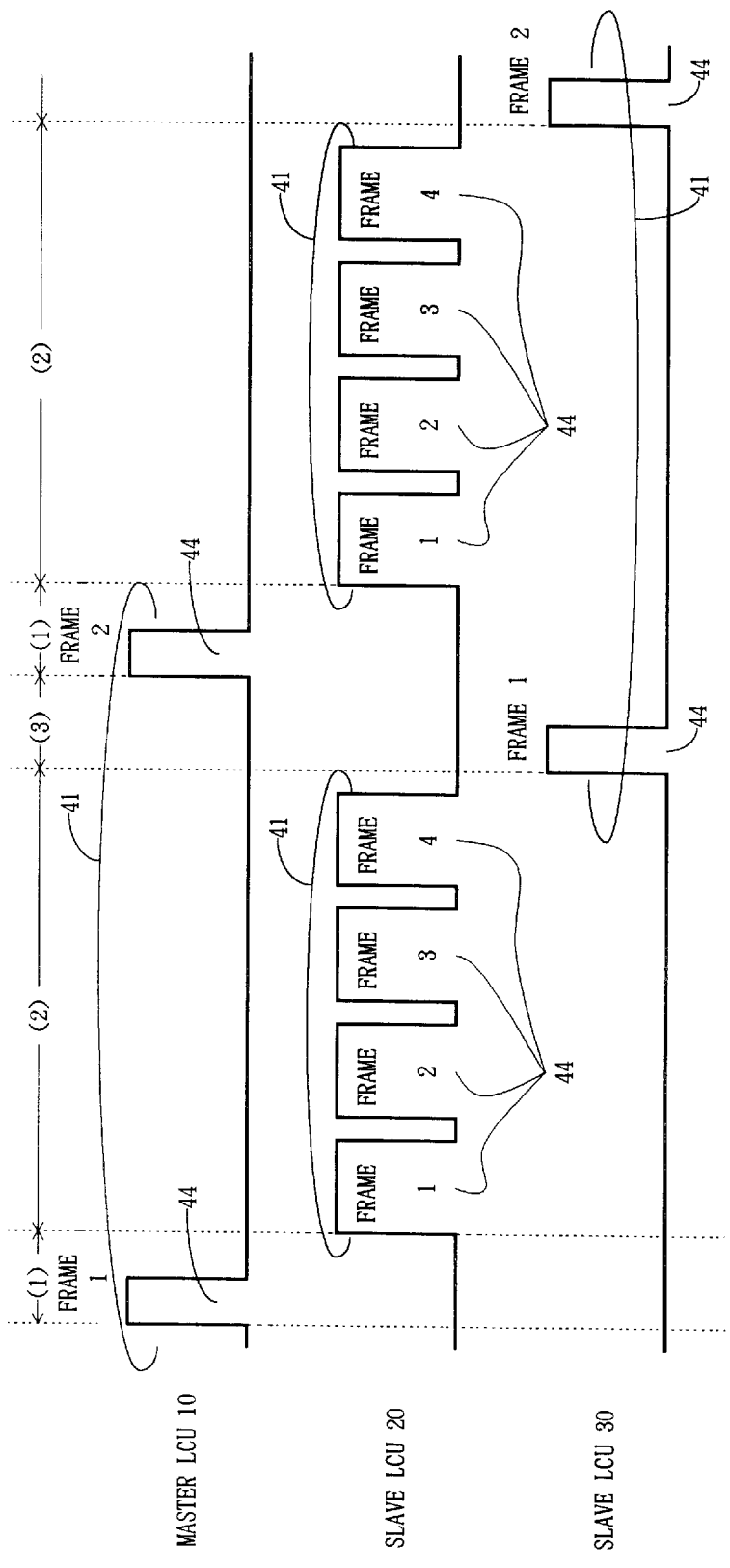

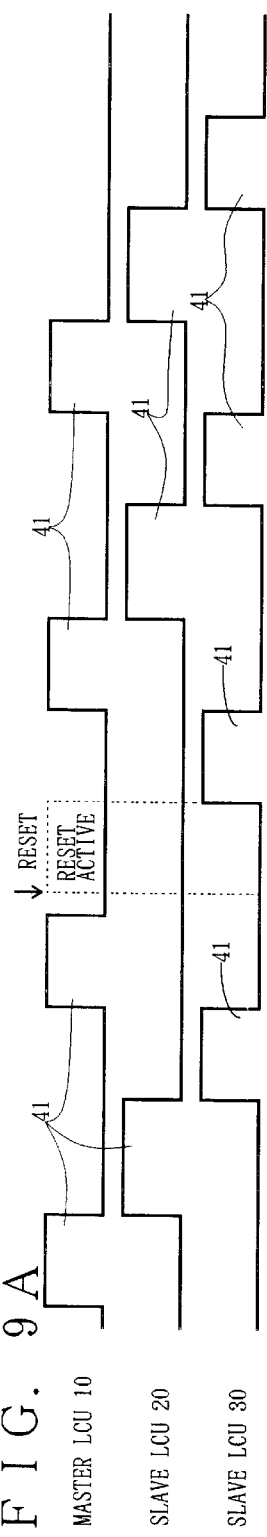
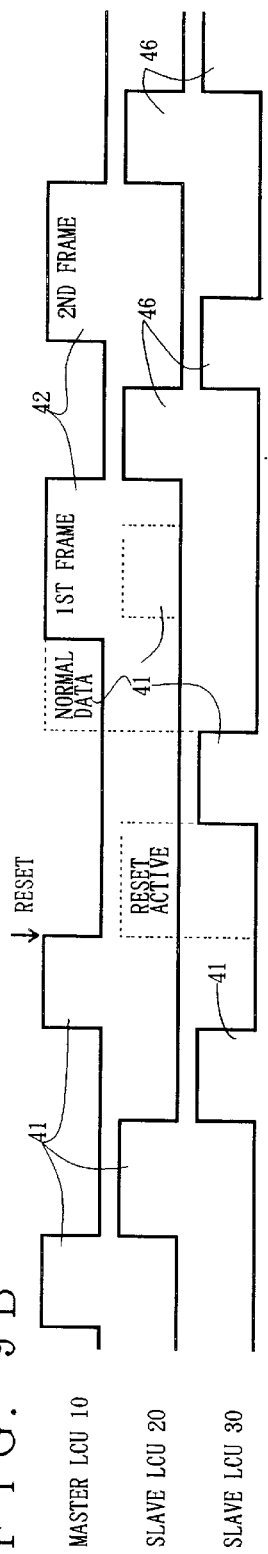
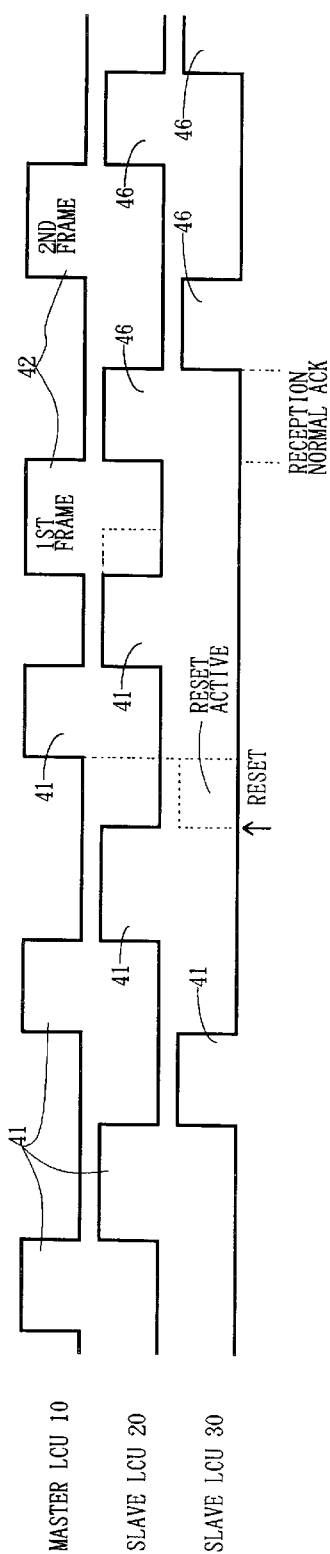

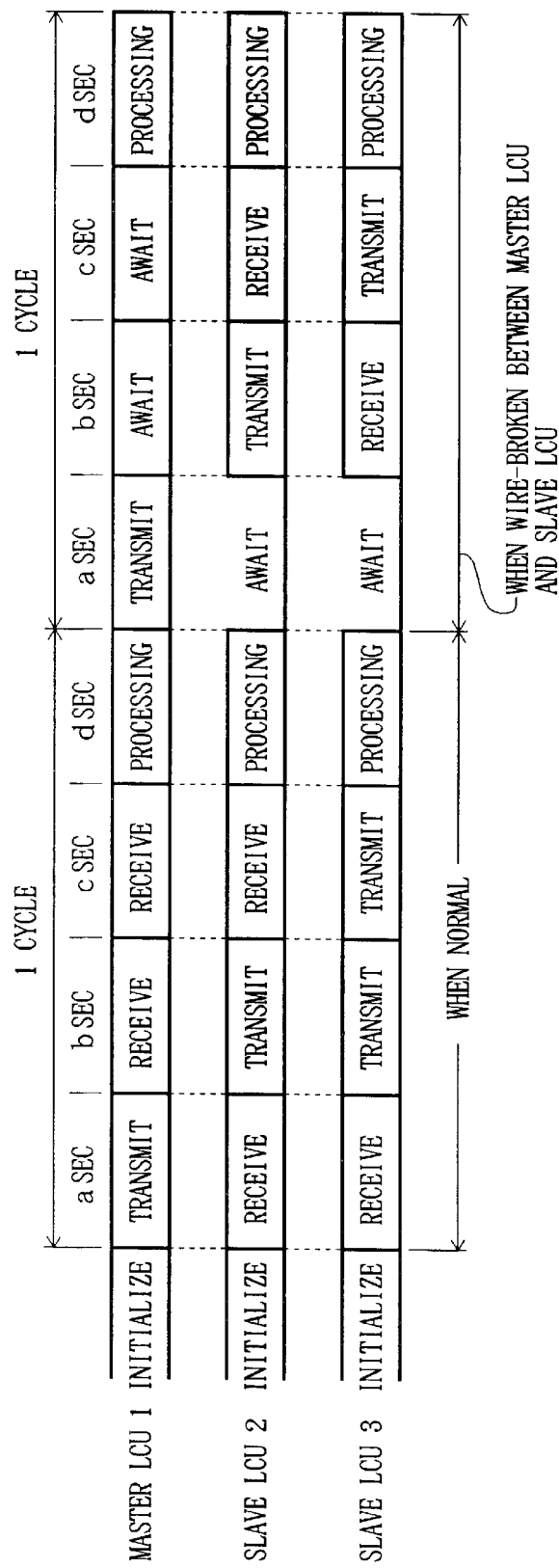

MULTIPLEX TRANSMISSION SYSTEM AND ABNORMALITY PROCESSING CONTROLLING METHOD AND APPARATUS USED THEREFOR

BACKGROUND OF THE INVENTION

1. Field of the Invention

The present invention relates to a multiplex transmission system for multiplexing information used for processing abnormality in load control (hereinafter referred to as abnormality processing control specification information: abnormality PCSI) and used in normal load control (hereinafter referred to as normality processing control specification information: normality PCSI) through a multiplex transmission network connected to load control units (LCUs) capable of controlling loads connected thereto. In the present invention, the load refers to electric components (e.g. a lamp, and air conditioner, water heater, etc.) mounted in a motor vehicle (e.g. bus, motor car, passenger vehicle).

2. Description of the Related Art

One example of the multiplex transmission system used for load control has been proposed in FIG. 10.

Such a kind of a previously known system as shown in FIG. 10 has been proposed.

A multiplex transmission system 5 includes a master load control unit (master LCU)1 and at least one slave load control units (slave LCUs) 2 and 3 (two in FIG. 10) which are interconnected through a multiplex transmission network 4.

The master LCU 1 and the slave LCUs 2 and 3 incorporate storage means 1a, 2a and 3a for receiving or storing abnormality PCSI is shown in FIG. 11. When communication abnormality occurs in the multiplex transmission network 4 owing to failure such as wire braking, the multiplex transmission system controls the processing (specifically, output control after wire breaking) in accordance with abnormality PCSI maintaining the control state (specifically, output before wire braking).

The storage means 1a, 2a and 3a store the abnormality PCSI, which are those for loads 2b, 2c and 3c, in its state multiplexed through the multiplex transmission network 4.

The normality PCSI or abnormality PCSI by the storage means 1a, 2a and 3a is updated by writing new normality PCSI or abnormality PCSI into the storage means 1a of the master LCU 1 from e.g. an external writing terminal connected to the master LCU 1.

It should be noted that the PCSI for the loads 2b, 2c, 3b, 3c includes the kind of the load and control method (e.g. abnormality processing of the blinking period of the lamp, lighting illuminance and door linkage lighting, power supply for air conditioner).

Setting a select switch (S1)6a or (S2)6b permits the load (L1)2b or (L2)2c to be controlled selectively through the slave LCU 2, and also permits the load (L3)3b or (L4)3c to be controlled selectively through the slave LCU 3.

In the multiplex transmission system as seen from FIG. 12, during the normal operation, the master LCU 1 falls in a transmission mode to transmit the normality or abnormality PCSI during a prescribed time (a sec in FIG. 12). At the same time, each slave LCU 2 or 3 falls in a reception mode during a prescribed time (a+α in FIG. 12) using an incorporated timer to receive the normality or abnormality PCSI and stores it on its storage means 2a or 3a.

Subsequently, the slave LCU 2 falls in the transmission mode to transmit the control information during a prescribed time (b sec in FIG. 12). At the same time, the master LCU 2 and slave LCU 3 fall in the reception mode during a prescribed time (b+α sec) using incorporated timers, respectively to receive the abnormality or normality PCSI from the control unit 2 and store it on the storage means 1a and 3a, respectively.

Likewise, the slave LCU 3 falls in the transmission mode to transmit the control information during a prescribed time (c sec in FIG. 12). At the same time, the master LCU 1 and slave LCU 2 fall in the reception mode during a prescribed time (c+α sec) using incorporated timers, respectively to receive the PCSI from the control unit 2 and store it on the storage means 2a and 1a, respectively.

In the conventional multiplex transmission system, the recovery processing from the abnormality state (e.g. succession of the previous state, or forcible ON or OFF attendant on control on the abnormality processing) can be performed as follows.

The master LCU 1 preferentially falls in the transmission mode to start abnormal mode communication. The multiplexing of the normality or abnormality PCSI received or previously stored by the master LCU 1 as shown in FIG. 12 is executed for the other slave LCUs 2 and 3 and this information is held in the corresponding storage means 2a and 3a. In this case, the slave LCU 2 controls the loads 2b and 2c connected to itself on the basis of the normality or abnormality PCSI multiplexed by the forcible abnormal communication. The slave LCU 3 also controls the loads 3b and 3c connected to itself on the basis of the normality or abnormality PCSI multiplexed by the forcible abnormal communication.

Additionally, it should be noted that the abnormality occurring in the multiplex transmission system includes operation abnormality of the LCU due to communication abnormality in the multiplex transmission network, breaking of a power source, etc.

However, where the communication abnormality occurs in the multiplex transmission network 4 owing to e.g. wire braking, the conventional multiplex transmission system 5 described above, as shown in FIG. 11, abnormality processing control (concretely, output control after wire braking) is effected in accordance with the abnormality PCSI to maintain the control state before the abnormality occurs (concretely, output before wire braking). Therefore, the control of maintaining the previous state is similarly effected for also the load giving inconvenience when the previous state is maintained. Specifically, for the water heater for which power supply is "on" before the communication abnormality occurs, the control of maintaining the previous state i.e. "on" state is effected, thus giving possibility of causing fire. In short, the default processing (concretely, succession of the previous state or forcible 'on'/'off' processing)is not suitably set for each load.

Where the abnormality or normality PCSI stored in the storage means 1a, 2a and 3a in the conventional multiplex transmission system 5 is updated, the normality or abnormality PCSI to be updated is stored in the storage unit 1a of the master LCU 1 from an external writing terminal connected thereto. Therefore, in the multiplex transmission system, loads having various control information may be changed by the user's convenience. When abnormality occurs in such a multiplex transmission system, the default processing attendant on the abnormality processing cannot be effected easily.

Further, since the multiplex transmission system using new abnormality PCSI cannot be easily designed at a place remote from the multiplex transmission system at issue, the multiplex transmission system cannot be updated easily, quickly, safely and surely.

In the abnormality processing control method and abnormality processing apparatus used in such a conventional multiplex transmission system 5, in the recovery processing from the abnormal state, the master LCU 1 preferentially falls into the transmission mode to start the abnormal mode communication so that the multiplexing of the abnormality PCSI received or previously stored by the master LCU 1 is forcibly effected for other LCUs (slave LCUs 2 and 3). Thus, the unnecessary abnormal mode communication during the recovery from the abnormal state is also carried out for the LCU(s) which operates normally.

For this reason, the normal load control or multiplex processing which has been carried out in to the LCU which operates normally will be stopped inadvertently.

In short, since the load control or multiplex processing being normally executed is stopped during the recovery from the abnormal state and carried out on the basis of the abnormal mode communication, the recovery processing of the load control or multiplexing cannot be carried out with high reliability and assurance.

SUMMARY OF THE INVENTION

An object of the present invention is to provide a multiplex transmission system which can perform easily, quickly, safely and surely the default processing attendant on the abnormality processing control when abnormality occurs, can be designed for a new load using optimum abnormality control information easily, quickly and surely at a place (e.g. user's factory) remote from the system at issue and can effect the control for electric appliances (lamp, airconditioner mounted on a motor vehicle such as a bus, motor car and passenger vehicle) easily, quickly and safely. The control includes the control for the abnormality of the blinking period, illumination brightness and door linkage illumination for the lamp and power supply control (e.g. abnormality control for the air conditioner), and to provide an abnormality processing control method and abnormality processing apparatus used in it.

Another object of the present invention is to provide a multiplex transmission system which can avoid to stop inadvertently the control of a load or multiplex processing being normally executed to execute the load control or multiplex processing based on the abnormal mode communication, thereby realizing the recovery processing for the load control and multiplex control with high reliability and assurance, and is highly resistant to disturbance such as noise, i.e. perform easily, quickly, safely and surely the default processing attendant on the abnormality processing control when abnormality occurs.

In order to attain the above objects, in accordance with one aspect of the present invention there is provided a multiplex transmission system comprising: a multiplex transmission network through which normality and abnormality processing control specification information (PCSI) for loads; a master load control unit (LCU) connected to said multiplex transmission network, which can multiplex the abnormality PCSI for a load as a main operation; a slave load control unit (LCU) connected to said multiplex transmission network, which can said abnormality PCSI as a slave operation between itself and said main LCU; and storage means, which is mountable in said mater LCU which can update and hold the information and read it at any time in a mounted state.

In accordance with another aspect of the present invention, there is provided a method for controlling multiplexing abnormality in a multiplex transmission system comprising the steps of: when said master LCU falls in an abnormal state while normal mode communication is executed and also normal mode communication is described in the communication mode information, executing the multiplexing for the master LCU using the normality PSCI stored in the slave LCU which is executing the normal mode communication, thereby urging the recovery to the normal state; when the slave LCU falls in an abnormal state while the normal mode communication is executed and also the normal mode communication is described in the communication mode information, executing the multiplexing for the slave LCU using the normality PSCI stored in the mater LCU or slave LCU which is normally executing the normal mode communication, thereby urging the recovery to the normal state; and when the slave LCU falls in an abnormal state while the normal mode communication is executed and also the abnormal mode communication is described in the communication mode information, executing the multiplexing for the slave LCU using the normality PSCI stored in the master, thereby urging the recovery to the normal state.

In accordance with still another aspect of the present invention, there is provided an apparatus for performing the above method, comprising: abnormality detecting means for detecting multiplex abnormality in occurring in said LCUs and specifying the LCU in an abnormal state on the basis of the recognition code to create abnormality information on the LCU in the abnormal state; and recovery control means for selecting said abnormal mode communication or the said normal mode communication to be executed according to said abnormality information as said abnormality processing, describes the selected mode as the communication mode and executes the selected recovery processing to urge the recovery to the normal state.

The above and other objects and features of the present invention will be more apparent from the following description taken in conduction with the accompanying drawings.

BRIEF DESCRIPTION OF THE DRAWINGS

FIG. 2 is a table showing the default information used in an abnormality processing control;

FIG. 3A is a view of the structure of a frame unit of abnormality or normality processing control information, and FIGS. 3B to 3E are views showing the data structure of the header in the frame structure;

FIG. 4 is a flowchart showing the abnormality processing control after reset in a master load control unit according to an embodiment of the present invention;

FIG. 5 is a flowchart showing the abnormality processing control after reset in a slave LCU according to an embodiment of the present invention;

FIG. 6 is a time sequence diagram showing the multiplex processing in an normal mode communication which is carried out by the multiplex transmission system according to an embodiment of the present invention;

FIGS. 7A to 7D are time sequence diagrams each showing the multiplex processing in an normal mode communication which is carried out by the multiplex transmission system according to an embodiment of the present invention;

FIG. 8 is a time sequence diagram showing the multiplex processing in an normal mode communication during the normal time which is carried out by the multiplex transmission system according to an embodiment of the present invention;

FIGS. 9A to 9C are time sequence diagrams each showing the multiplex processing in an normal mode communication at the abnormal time which is carried out by the multiplex transmission system according to an embodiment of the present invention;

FIG. 11 is a table showing the default information used in the conventional abnormality processing control; and FIG. 12 is a time sequence diagram showing the multiplex processing in a normal mode communication and that in an abnormal mode communication which are executed in the conventional multiplex transmission system.

DESCRIPTION OF THE PREFERRED EMBODIMENTS

Figure 1:
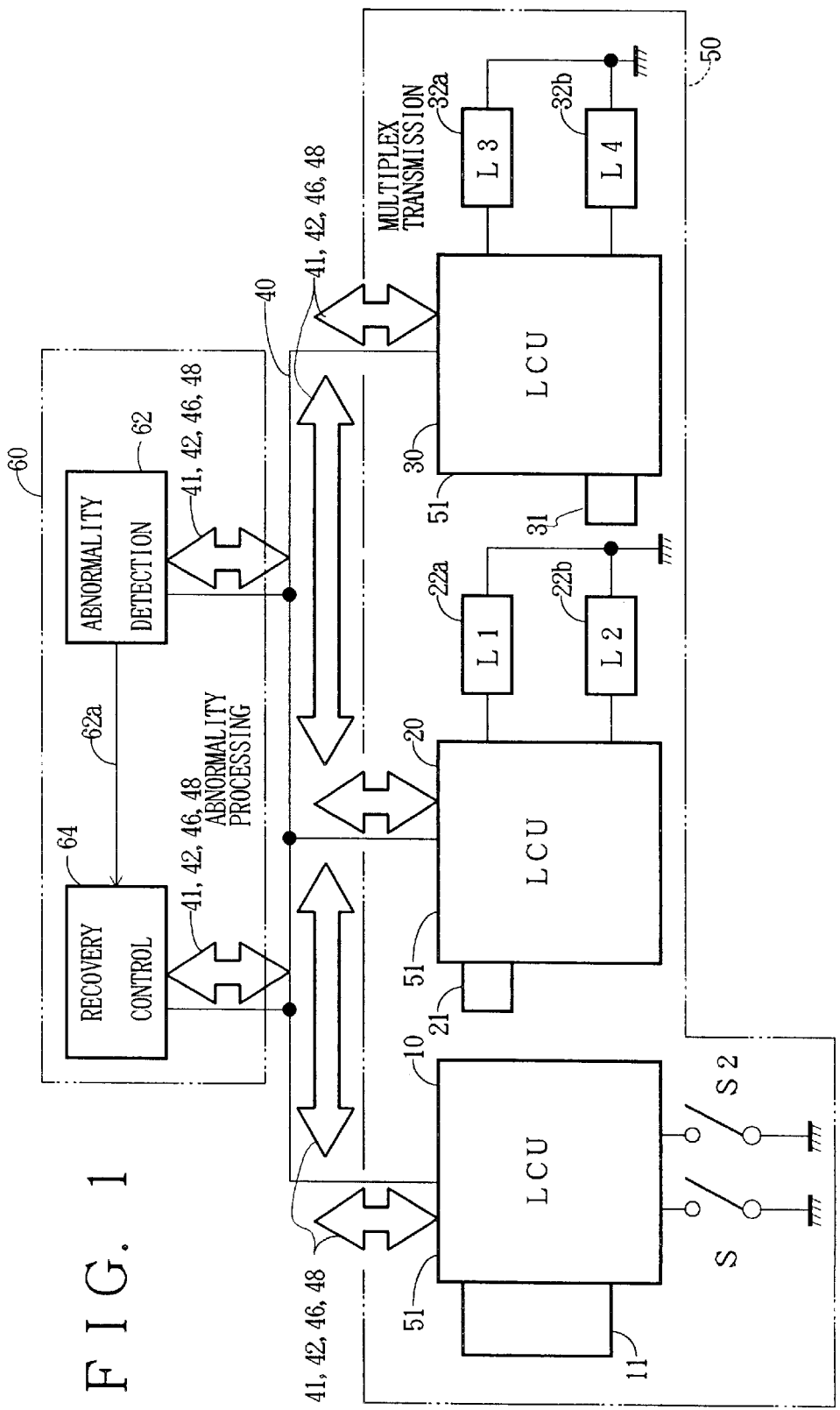
FIG. 1 is a functional block diagram of a multiplex transmission system according to an embodiment of the present invention and an abnormality processing apparatus used in it.

Now referring to the drawings, an explanation will be given of several embodiments of the present invention.

Figure 10:
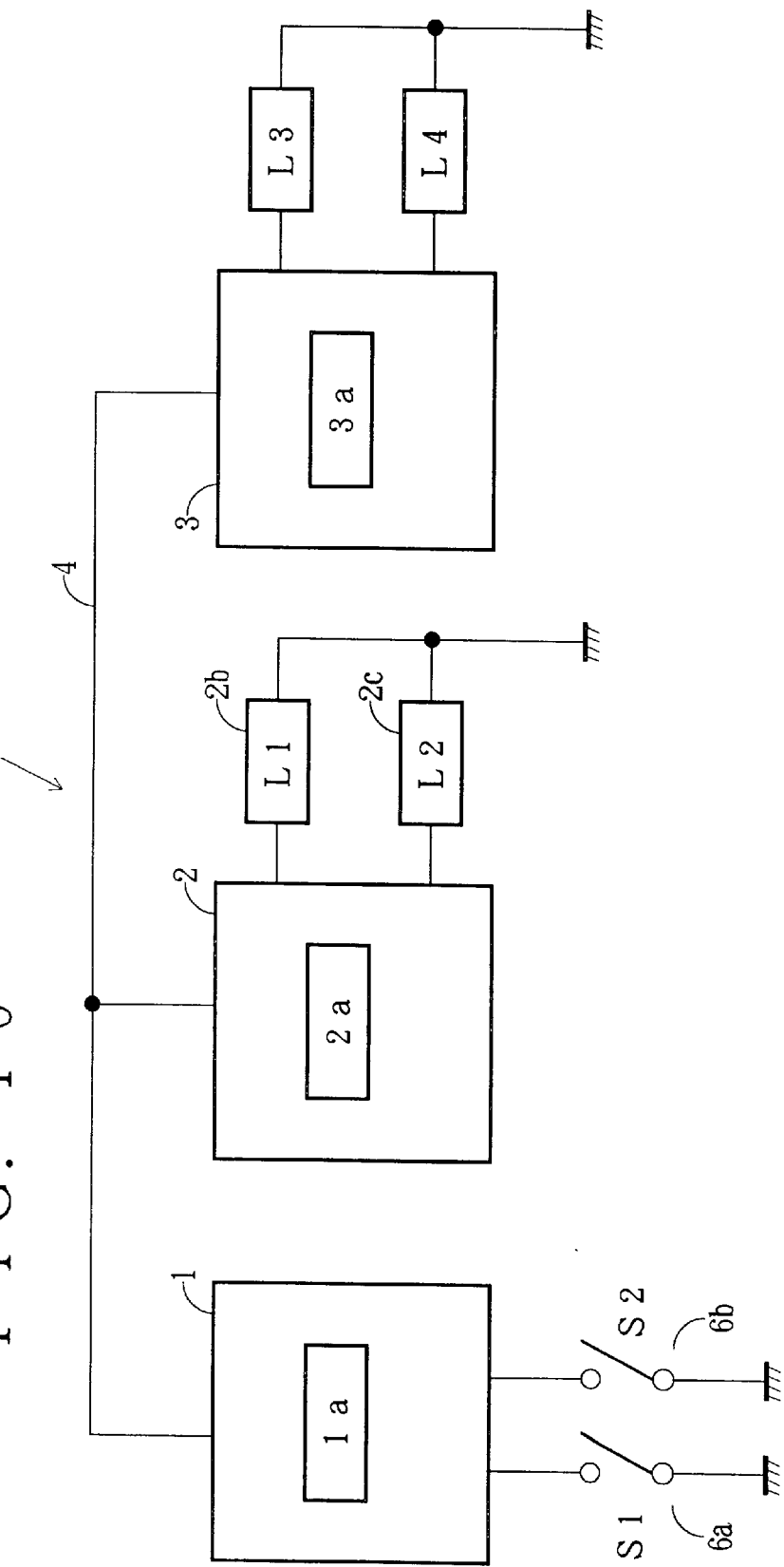
FIG. 10 is a functional block diagram showing a conventional multiplex transmission system.

In the explanation of the present invention, like reference numerals refer to like elements in FIGS. 10–12 regarding the prior art.

First, an explanation will be given of the multiplex transmission system according to an embodiment of the present invention. As seen from FIG. 1, the multiplex transmission system 50 includes a removable external storage means 11, a multiplex transmission network 40 and a plurality of LCUs 51 connected thereto.

The multiplex transmission network 40 is a signal line serving to receive or transmit information which is a single optical fiber cable. Although the multiplex transmission network 40 may be a coaxial cable or a wiring harness (WH) with twisted pair line lines bundled, in this embodiment, the optical fiber cable is used in view of an increase in the diameter or weight.

The removable external storage 11 may be an EEPROM, which can be mounted in the master LCU 10 or slave LCU. This storage can update, hold and can read out the abnormality PCSI 42 in a mounted state.

The storage 11 previously stores the abnormality PCSI 42 for controlling a switch (S1, S2) and load (L1, L2, L3, L4) as shown in FIG. 2.

It should be noted that the abnormality PCSI 42 has the same property as explained in the prior art.

The concrete abnormality PCSI 42 is shown in FIG. 2. The abnormality PCSI 42 includes control instructions or data for causing the multiplex transmission system 50 to execute a previous state continuing processing, forcible ON processing and forcible OFF processing. The previous state continuing processing is to maintain the control state for the load (e.g. output before wire braking) before communication abnormality occurs when the communication abnormality occurs in the multiplex transmission network 40 because of wire braking as shown in FIG. 2 in the multiplex transmission network 40 (default processing). The forcible ON processing is to control the load into the ON state regardless of the previous state. The forcible OFF processing is to control the load into the OFF state irrespectively of the previous state.

More specifically, the previous state continuing processing is the default processing of maintaining the output before the wire braking after the abnormality occurs as defined in load L3 in FIG. 2 (OFF→OFF, ON→→ON). This default processing is efficient as abnormality processing control for the load or electric appliance such as an air conditioner, "car stereo", etc. which is desired to maintain the previous state. The forcible ON processing is the default processing of controlling the output before the wire braking occurs in the ON state regardless of its state (OFF→ON, ON→ON). This default processing is efficient as abnormality processing for the load which is dangerous when lighting illumination and door linkage illumination brinks inadvertently, as defined in L1 in FIG. 2. The forcible OFF processing is the default processing of controlling the output before the wire braking occurs in the OFF state regardless of its state (OFF→OFF, ON→OFF). This default processing is efficient as abnormality processing for the load such as a water heater which is dangerous when it is excessively heated, as defined in L1 in FIG. 2.

The "electric mounting" in this embodiment means a signal processable state through a metallic electrode connector provided in the reading means. But it may be replaced by the connection using electromagnetic force (e.g. radio wave, electrostatic induction) or the optical connection using infrared rays or visible light.

The non-volatile memory (e.g. EEPROM) serving as the removable external storage 11 which is in a removable state (e.g. IC card or IC connector) may be inserted into the reading means mounted in the LCU 10 to read the desired abnormality PCSI 42 into the master LCU 10. Incidentally, the removable external storage means 11 may be magnetic recording means (e.g. magnetic, magnetic disk, bubble memory) or optomagnetic recording means (e.g. MO disk) as long as it is an external storage means whose storage contents can be held at any number of times at any time.

As seen from FIG. 1, a plurality of LCUs 51 are connected to the multiplex transmission network 40.

The plurality of LCUs 51 which are connected to the multiplex transmission network 40 multiplexes the abnormality PCSI 42 due to control information of the load 22a, 22b, 32a, 32b or normality PCSI 41 due to the control result of the load through the multiplex transmission network 40, and can control the loads 22a, 22b and 32a, 32b connected to themselves.

The LCUs 51 include a master LCU 10 which is connected to the multiplex transmission network 40 and can execute the multiplexing based on the abnormality PCSI 42 as a master system and at least one slave LCU 20, 30 which executes the multiplexing itself and the master LCU 10.

An explanation will be given of the configuration of the master LCU 10.

As seen from FIG. 1, the master LCU 10 is provided with the removable external storage means which can update or hold its own normality PCSI to be multiplexed at any time and read it at any time.

The master LCU 10 and the slave LCU 20, 30 have a configuration which can execute the operation described later in connection with FIGS. 6 to 9.

More specifically, the master LCU 10 includes a communication I/F circuit for transmitting the abnormality PCSI 42 through the multiplex transmission network 40 between the LCUs, an input I/F to which a plurality of switches S1, S2 are connected, a read only memory (ROM) which stores a prescribed control program (inclusive of a communication protocol for multiplex transmission) and fixed data, a temporary memory (RAM)14 used as a work area where the abnormality PCSI is developed in executing the control program, a metallic electric connector connected to the removable external storage 11, an internal timer for multiplexing during the abnormal communication mode, and an MPU for executing the multiplexing or other processing (the details of these operations are described later). The output I/F circuit is provided with a diagnosis output indicative of the inconvenient state of the load.

The MPU mounted on the master LCU 10, when a prescribed number of times of coincidence of abnormality PCSI is obtained, takes in the PCSI and executes the multiplexing between itself and the slave LCU 20 or 30.

Further, the MPU mounted on the master LCU 10 successively executes the multiplexing for each of a prescribed number of unit frames, into which the abnormality PCSI is divided, between it and the slave LCU 2- or 30, in synchronism with a reception normal ACK 46 signal generated by the slave LCU 20 or 30 when it receives the unit frame normally.

Further, the MPU mounted on the master LCU 10 also decides coincidence between the check sum information of the abnormality PCSI 42 transmitted by itself and the acknowledge ACK received from each of the salve LCUs. If the coincidence therebetween is obtained, it completes the multiplexing and advances to the normal mode communication. If not, it executes the multiplexing again for each frame unit 44 on the basis of the abnormality PCSI.

The configuration of slave LCUs (two in this embodiment) is basically the same as that of the master LCU. But, it should be noted that the a plurality of sensors (e.g. temperature sensor) are connected to the input I/F circuit, and a plurality of loads (L1, L2: L3, L4) are connected to the output I/F circuit.

Now referring to FIG. 3, the structure 43 of the unit frame 44 used in the multiplex transmission system according to the present invention will be explained below.

The unit frame 44 is a transmission unit of the abnormality PSCI 42 or normality PSCI 41 to be transmitted (i.e. multiplexed) through the multi-transmission network 40. The structure of the unit frame 44 includes a header 45 on which a communication protocol for multiplexing through the multiplex transmission network 45 is described and a series of data 44 indicative of the abnormality PSCI or normality PSCI.

Incidentally, as seen from FIG. 3, the unit frame 44 may includes BCC (block checksum character) which means a checksum of the unit frame transmitted or received.

The structure of the header 45 in the unit frame 44 will be explained. As seen from FIGS. 3B and 3C, the header 45 includes communication mode information 45a, recognition code information 45b and frame kind information 45c.

As seen from FIGS. 3B, 3C and 3D, the header 45 is composed of 8 bits including communication mode information 45a (B7), recognition code information 45b (B6, B5), frame kind information 45c (B4) and frame numbers (B3–B0).

When the abnormal mode communication 45a-2 (multiplexing of the abnormality PSCI) or normal mode communication 45a-1 (mutliplexing of the normality PSCI) is executed, the communication mode information 45a is described by the LCU itself.

The discrimination code information 45b is representative of whether a transmission source is the master LCU or the slave LCU. This information is described by the LCUs 51, 51, . . . when the abnormality PSCI 42 or normality PSCI is transmitted in a divided manner of unit frames.

The frame kind information 45c is indicative of whether the kind of the unit frame 44 transmitted is an ACK frame 45c-1 or a normal frame 45c-2. The ACK frame is the unit frame 44 of the abnormality PSCI multiplexed by an environment executing the abnormal mode communication 45a-2. The normal frame 45c-2 is the unit frame of the normality PSCI multiplexed by an environment executing the normal mode communication 45a-1.

An explanation will be given of the configuration of an abnormality processing apparatus 60. As seen from FIG. 1, the abnormality processing device 60 according to the embodiment of the present invention includes an abnormality detecting means 62 and a recovery control means 64 which are connected to the multiplex transmission network 40 and connected to each other.

The abnormality processing device 60 can execute the abnormality processing method (i.e. recovery processing) as described later with reference to FIGS. 6 to 9 and the flowcharts of FIGS. 4 and 5.

As shown in FIG. 1, the abnormality detecting means 62 is connected to the recovery control means 64 and multiplex transmission network 40 so that it detects the abnormal state of multiplexing occurring in each LCU 51 and specifies the LCU in the abnormal state on the basis of the discrimination code 45b described on the header 45 to create abnormal LCU information 62a.

Further, the recovery control means 64 is connected to the abnormality detecting means 62 and the multiplex transmission network 40 so that it selects the abnormal mode communication 45a-2 or normal mode communication 45a-1 to be executed as recovery processing in accordance with the abnormal LCU information 62a, and describes the communication mode information 45a in the header 45 to execute the selected recovery processing for the LCU in which multiplexing abnormality occurs on the basis of the abnormality LCU information 62a and communication mode 45a.

The concrete configuration of each of the recovery control means 64 and the abnormality detecting means 62 is basically the same as that of the LCU.

It includes an communication I/F circuit for transmitting the abnormality PCSI 42 through the multiplex transmission network 40, a read only memory (ROM) for storing a control program (inclusive of the communication protocol for multiplex transmission) for prescribed recovery processing and fixed data, a readable/writable temporary memory (RAM) which is a work area where the abnormality PCSI 42 or normality PCSI 41 is developed when the control program is executed, an internal timer for recovery processing in abnormality of the communication mode, and MPU for executing the recovery processing and other.

The abnormality processing control method according to the present invention executed by the abnormality processing device 60 can be totally executed by the MPUs mounted in the recovery control means 64 and abnormality detecting means 62.

The MPU is connected to the slave LCU 20, 30 and master LCU 10 through the multiplex transmission network 40 so that the multiplexing for each unit frame 44 can be monitored in synchronism with the reception normal ACK 46 signal created by the slave LCU 20, 30 when the unit frame 44 is normally received.

The MPU decides coincidence between the checksum information of the abnormality PCSI 42 transmitted by itself and the acknowledge ACK received from each salve LCU 20, 30. If the coincidence is obtained, the multiplexing of the abnormality PSCI is completed to advance to the normal mode communication. If the coincidence is not obtained, the multiplexing for each unit frame 44 on the basis of the abnormality PCSI is monitored again.

The MPU mounted in the recovery control means 64 and abnormality detecting means 62 performs the abnormality processing control method described above for the master or slave LCU in an abnormal state to urge its recovery to the normal state.

Now referring to FIG. 6, an explanation will be given of the multiplexing of the abnormality PCSI while the multiplex transmission system is in a normal state.

[Procedure 1]

After the power is turned on owing to resetting of the abnormality processing control, the slave LCU 20, 30 reads the abnormality PCSI 42 from the removable storage (EEPROM) 21, 31 into the temporary storage 24, 34 (FIG. 6(1)).

Simultaneously, the master LCU 10 also reads the abnormality PCSI 42 from the removable storage (EEPROM) 11.

In an embodiment of the present invention, the same abnormality PCSI 42 will be continuously read plural times. In this case, if the abnormality PCSI 42 read plural times (three times in the embodiment) coincides with each other, it is stored in the temporary storage as real abnormal PCSI.

[Procedure 2]

The master LCU 10 divides the abnormality PCSI into a prescribed number of unit frames 44 (16 unit frames (1 frame: 8 bytes)) to be multiplexed for each unit frame (FIG. 6 (2)) successively.

Specifically, the first fame unit 44 is multiplexed, second unit frame 44, . . . . . . last frame unit in a prescribed number of frames units are multiplexed in a predetermined order.

[Procedure 3]

The master LCU 10, when it normally receives the unit frame 44, performs the multiplexing in synchronism with the reception normal ACK 46 created by the slave LCU 20, 30 (FIG. 6(2))

In this case, the reception normal ACK 46 serves as a transmission starting command of the unit frame to the slave LCU 20, 30.

[Procedure 4]

Each slave LCU 20, 30, when it normally receives the unit frame transmitted by the master LCU 10, transmits the unit frame ACK 46 to the master LCU 10 (FIG. 6 (2)).

The master LCU 10 transmits the already transmitted unit frame again until it receives the reception normal ACK.

When the master LCU 10 receives the reception normal ACK 46, it transmits a new frame unit successive to the transmitted unit frame 44 (FIG. 6 (2)). Specifically, the first frame—second frame . . . . . . 15-th unit frame—16-th unit frame will be successively transmitted (FIG. 6(2)).

[Procedure 5]

After a prescribed number of unit frames 44 (16 in this embodiment) have been transmitted, each slave LCU 20 ,30 computes check sum information of the abnormality PCSI 42 and transmits it to the master LCU 10 (FIG. 6(3)).

The successive transmission of the unit frames is completed when the reception normal ACKs corresponding to the number of the transmitted unit frames (16 in this embodiment ) are sent back from the slave LCU 20 ,30 to the master LCU 10.

[Procedure 6]

When both acknowledge ACKs (the acknowledge ACKs of the slave LCU 20, 30 and the master LCU 10) are not coincident with each other, the master LCU 10 decides that the abnormality PCSI has not been normally transmitted and performs the multiplexing for the unit frame 44 of the abnormality PCSI 42.

If the coincidence is obtained, the slave 20, 30 decides coincidence between the abnormality PCSI held in its own storage 21, 31 and the abnormality PCSI received from the master LCU 10.

If the coincidence regarding the abnormality PCSI is not obtained, the slave LCU 20, 30 updates the contents of its own storage 21, 31 to that received from the master LCU. Then it completes the multiplexing of the abnormality PCSI 42 and decides that the multiplexing of the abnormality PCSI 44 has been normally completed to shift to the normal mode communication.

[Procedure 7]

The master LCU 10 decides coincidence between the cheksum information of the abnormality PCSI 42 transmitted by itself and the acknowledge ACK received from each slave LCU 20, 30.

If the coincidence is obtained, the master LCU 10 decides that the communication mode of the abnormality PCSI 44 has been normally completed to shift to the normal mode communication.

If the coincidence is obtained, the master LCU 10 mulitplexes the abnormal PCSI for each unit frame 44.

Now referring to FIG. 7, an explanation will be given of the multiplexing of the abnormal PCSI during the abnormal mode communication.

In this embodiment, where abnormality occurs in the multiplex transmission network 40 before the mulitplexing of the abnormality PCSI explained in connection with the FIG. 6 terminates, the multiplex transmission system 50 is entirely disabled.

An explanation will be given of the examples of multiplexing of the abnormality PCSI when abnormality occurs.

EXAMPLE 1

Where abnormality occurs in the master LCU 10, since both slave LCUs 20 ,30 are in a reception state of the abnormality PCSI from the master LCU 10, the entire multiplex transmission system will be disabled (FIG. 7A).

EXAMPLE 2

Where abnormality occurs in the slave LCU 20 or 30, after the slave LCUs receive the abnormality PCSI from the mater LCU 10, they start their own internal timers. Because of the operation of the internal timers, the normal slave LCU can transmit the reception normal ACK 46 (FIG. 7B).

EXAMPLE 3

Where abnormality occurs in the slave LCU 30, after the master LCU 10 receives the reception normal ACK from the slave LCU 20, it starts its own internal timer. Because of the operation of the internal timer, the master LCU 10 can transmit the abnormal PCSI again after a prescribed time (measured by the internal timer) without receiving the reception normal ACK from the abnormal slave LCU 30 (FIG. 7C).

EXAMPLE 4

Where abnormality occurs in both slave LCUs, after the master LCU 10 transmits the abnormal PCSI once, it starts its own internal timer. Because of the operation of the internal timer, the master LCU 10 can transmit the abnormality PCSI again without receiving the reception normal ACK from the slave LCUs (FIG. 7D).

Now referring to FIGS. 7A to 7D and 9A to 9D, an explanation will be given of a method of abnormality processing. This method executes the following to recovery processing (recovery processing 1 to 3) to urge the recovery from the abnormal state.

[Recovery Processing 1]

It is assumed that the master LCU 10 falls in the abnormal state while the normal mode communication 45a-1 is executed. In this case, if the normal mode communication 45a-1 is described as the communication mode information 45, the muliplexing of the normal PCSI 41 stored in the slave LCU 20, 30 executing the normal mode communication 45a-1 is performed for the master LCU to urge its recovery to the normal state (FIG. 9A).

[Recovery Processing 2]

It is assumed that the slave LCU 20 or 30 falls in the abnormal state while the normal mode communication 45a-1 is executed. In this case, if the normal mode communication 45a-1 is described as the communication mode information 45a, the muliplexing of the normality PCSI stored in the slave LCU normally executing the normal mode communication or master LCU 10 is performed for the slave LCU in the abnormal state to urge its recovery to the normal state (FIG. 9B).

[Recovery Processing 3]

It is assumed that the slave LCU 20 or 30 falls in the abnormal state while the normal mode communication 45a-1 is executed. In this case, if the abnormal mode communication 45a-2 is described as the communication mode information 45a, the multiplexing of the abnormal PCSI stored in the master LCU 10 is performed for the slave LCU in the abnormal state to urge its recovery to the normal state (FIG. 9C).

Now referring to the flowcharts of FIGS. 4 and 5, an explanation will be given of the above recovery processing executed by the abnormality processing device 60 as shown in FIGS. 9A to 9C.

[Recovery Processing 1]

Now referring to FIG. 4, the recovery processing for the master LCU 1 will be explained. First, the MSB B7 of the header is checked (step S1). When the abnormality LCU information 62a is created on the basis of the fact that the normal mode communication 45a-1 is described as the communication mode information 45a (step S2—"Y" in step S3), the recovery control means 64 performs the muliplexing of the normal PCSI 41 stored in the slave LCU 20, 30 executing the normal mode communication 45a-1 is performed for the master LCU to urge its recovery to the normal state ("Y" of step S3—step S4.

When it is decided that the abnormal mode communication 45a-2 is described as the communication mode information 45a ("Y" in step S2 or "N" in step S2—"N" in step S3), the recovery control means 64 control the master LCU 10 so that it executes the abnormal mode communication 45a-2 based on the abnormal PCSI 42 during the normality as shown in FIG. 7 ("Y" in step S2—step S5—step S6—step S7) and recovers to the normal state (normality mode communication 45a-1)(step S4).

Now referring to FIG. 5, the recovery processing executed for the slave LCU will be explained.

In the recovery processing for the slave LCU 20, 30, the abnormal mode communication 45a-2 or normal mode communication 45a-1 of the master LCU 10 is always monitored. Therefore, when a requirement of the abnormal mode communication 45a-2 is detected from the header, the abnormal mode communication 45a-2 in steps S15 to S17 can be executed.

[Recovery Processing 2]

The MSB B7 of the header 45 is checked (step S11). When the normal mode communication 45a-1 is described as the communication mode 45a ("Y" in step S13) and the abnormal LCU information 62a is created, the recovery control means 64 executes the multiplexing of the normality PCSI stored in the slave LCU normally executing the normal mode communication or master LCU 10 for the slave LCU in the abnormal state to urge its recovery to the normal state ("Y" in step S13—S14 in step S14).

[Recovery Processing 3]

In step S13, when the abnormal mode communication 45a-2 is described as the communication mode information 45a ("N" in step S13) and the abnormality LCU 62a is created on the basis of it ("N" in step S13), the recovery control means 64 performs the multiplexing of the abnormal PCSI stored in the master LCU 10 for the slave LCU in the abnormal state to urge its recovery to the normal state.

What is claimed is:

1. A multiplex transmission system comprising:
   a multiplex transmission network through which normality and abnormality processing control specification information (PCSI) for loads are transmitted;
   a master load control unit (LCU) connected to said multiplex transmission network, which multiplexes the abnormality PCSI for each of the loads as a main operation;
   a slave load control unit (LCU) connected to said multiplex transmission network, which multiplexes said abnormality PCSI as a slave operation between itself and said master LCU; and
   external removable storage means, which is mountable in said master LCU and slave LCU which can update and hold the information and read the information at any time in a mounted state,
   wherein said abnormality processing control specification information includes a default processing including a previous state continuing processing, a forcible ON processing, and a forcible OFF processing.

2. A multiplex transmission system according to claim 1, wherein said abnormality PSCI can be set in accordance with the kind of the load to be controlled.

3. A multiplex transmission system according to claim 1, wherein said abnormality PSCI is divided into a prescribed number of unit transmission frames.

4. A multiplex transmission system according to claim 3, wherein each of said unit transmission frames includes:
   a header in which a communication protocol is described in multiplexing the abnormality PCSI through said multiplex transmission network; and
   a series of data inclusive of said normality and abnormality PCSI, said header including
      communication mode information indicative of a normal communicating mode for multiplexing of said normality PCSI, or an abnormal communication mode for multiplexing of said abnormality PCSI; and
      code information for discriminating the master LCU and slave LCU from each other.

5. A multiplex transmission system according to claim 4, wherein said header further includes frame information for discriminating a normal frame and an ACK frame from each other, said normal frame being a unit frame of the normality PCSI to be multiplexed in the normal mode communication, said ACK frame being a unit frame of the abnormality PCSI to be multiplexed in the environment executing the normal mode communication.

6. A multiplex transmission system according to claim 3, wherein said master LCU multiplexes the abnormality PCSI taken from said external storage means during said abnormality mode communication for each of the prescribed number of said unit transmission frames in synchronism with a reception normal ACK which is transmitted when said slave LCU has normally received one of said unit transmission frames.

7. A multiplex transmission system, comprising:

a multiplex transmission network through which normality and abnormality processing control specification information (PCSI) for loads, divided into a prescribed number of unit transmission frames, are transmitted;

a master load control unit (LCU) connected to said multiplex transmission network, which multiplexes the abnormality PCSI for each of the loads as a main operation;

a slave load control unit (LCU) connected to said multiplex transmission network, which multiplexes said abnormality PCSI as a slave operation between itself and said master LCU; and external removable storage means, which is mountable in said master LCU and slave LCU which can update and hold the information and read the information at any time in a mounted state, wherein said master LCU multiplexes the abnormality PCSI taken from said external storage means during said abnormality mode communication for each of the prescribed number of said unit transmission frames in synchronism with a reception normal ACK which is transmitted when said slave LCU has normally received one of said unit transmission frames, wherein in multiplexing during the abnormal mode communication, when said slave LCU has normally received one of said unit transmission frames in said abnormality PCSI transmitted by said master LCU, said slave LCU transmits the reception normal ACK to the master LCU, and said master LCU executes said unit transmission frames again until said master LCU receives the reception normal ACK, and said master LCU executing a new unit frame subsequent to the unit transmission frames already transmitted when said master LCU receives the reception normal ACK.

8. A multiplex transmission system, comprising:

a multiplex transmission network through which normality and abnormality processing control specification information (PCSI) for loads, divided into a prescribed number of unit transmission frames, are transmitted;

a master load control unit (LCU) connected to said multiplex transmission network, which multiplexes the abnormality PCSI for each of the loads as a main operation;

a slave load control unit (LCU) connected to said multiplex transmission network, which multiplexes said abnormality PCSI as a slave operation between itself and said master LCU; and external removable storage means, which is mountable in said master LCU and slave LCU which can update and hold the information and read the information at any time in a mounted state, wherein said master LCU multiplexes the abnormality PCSI taken from said external storage means during said abnormality mode communication for each of the prescribed number of said unit transmission frames in synchronism with a reception normal ACK which is transmitted when said slave LCU has normally received one of said unit transmission frames, wherein said slave LCU creates an acknowledge ACK which is check sum information for the abnormality PSCI received from said master LCU to decide a coincidence between the created acknowledge ACK and an acknowledge ACK received from the master LCU, if the coincidence is not obtained, executes multiplexing for each unit frame on the basis of the abnormality PSCI stored in the master LCU, if the coincidence is obtained, further decides the coincidence between the abnormality PSCI held in the storage means of the slave LCU and that received from the master LCU and if the coincidence is not obtained, updates the contents of the storage means of the slave LCU to the abnormality PSCI received from the master LCU to complete the multiplexing in said abnormality mode communication.

9. A method for controlling abnormality processing in a multiplex transmission system having:

a multiplex transmission network through which normality and abnormality processing control specification information (PCSI) for loads, divided into a prescribed number of unit transmission frames, are transmitted;

a master load control unit (LCU) connected to said multiplex transmission network, which multiplexes the abnormality PCSI for each of the loads as a main operation;

a slave load control unit (LCU) connected to said multiplex transmission network, which multiplexes said abnormality PCSI as a slave operation between itself and said master LCU; and external removable storage means, which is mountable in said master LCU and slave LCU which can update and hold the information and read the information at any time in a mounted state, wherein said master LCU multiplexes the abnormality PCSI taken from said external storage means during said abnormality mode communication for each of the prescribed number of said unit transmission frames in synchronism with a reception normal ACK which is transmitted when each of said slave LCUs has normally received one of said unit transmission frames.

said method of controlling abnormality processing comprising the steps of:

when said master LCU falls in an abnormal state while the normal mode communication is executed and also when the normal mode communication is described as the communication mode information, executing the multiplexing for the master LCU using the normality PSCI stored in the slave LCU which is executing the normal mode communication, thereby urging its recovery to the normal state;

when the slave LCU falls in the abnormal state while the normal mode communication is executed and also when the normal mode communication is described in the communication mode information, executing the multiplexing for the slave LCU using the normality PSCI stored in the master LCU or slave LCU which is normally executing the normal mode communication, thereby urging the recovery to the normal state; and when the slave LCU falls in the abnormal state while the normal mode communication is executed and also the abnormal mode communication is described in the communication mode information, executing the multiplexing for the slave LCU using the normality PSCI stored in the master, thereby urging the recovery to the normal state.

10. A method for controlling multiplexing abnormality according to claim 9, wherein said abnormality includes an operation abnormality in the slave control unit due to communication abnormality in the multiplex transmission network and instantaneous power failure of the multiplex transmission network.

11. An apparatus for performing the method defined in claim 9, comprising:

abnormality detecting means for detecting multiplex abnormality in occurring in said LCUs and specifying the LCU in the abnormal state on the basis of the recognition code to create abnormality information on the LCU in the abnormal state; and recovery control means for selecting said abnormal mode communication or the said normal mode communication to be executed according to said abnormality information as said abnormality processing, describes the selected mode as the communication mode and executes a selected recovery processing to urge the recovery to the normal state.

\* \* \* \* \*